(12) United States Patent
Seigneurbieux

(10) Patent No.: US 7,428,239 B1
(45) Date of Patent: Sep. 23, 2008

(54) APPARATUS AND METHOD FOR PRIORITY QUEUING WITH SEGMENTED BUFFERS

(75) Inventor: Pierre Seigneurbieux, San Jose, CA (US)

(73) Assignee: Software Site Applications, Limited Liability Company, Wilmington, DE (US)

( * ) Notice: Subject to any disclaimer, the term of this patent is extended or adjusted under 35 U.S.C. 154(b) by 309 days.

(21) Appl. No.: 10/927,801

(22) Filed: Aug. 26, 2004

(51) Int. Cl.
*H04L 12/56* (2006.01)

(52) U.S. Cl. ...................................... 370/418; 370/429

(58) Field of Classification Search ................ 370/417, 370/418
See application file for complete search history.

(56) References Cited

U.S. PATENT DOCUMENTS

| | | | | |
|---|---|---|---|---|
| 5,828,653 A | * | 10/1998 | Goss | 370/230 |
| 5,838,915 A | * | 11/1998 | Klausmeier et al. | 709/215 |
| 6,018,515 A | * | 1/2000 | Sorber | 370/229 |
| 6,067,301 A | * | 5/2000 | Aatresh | 370/418 |
| 6,091,709 A | * | 7/2000 | Harrison et al. | 370/235 |
| 6,765,905 B2 | * | 7/2004 | Gross et al. | 370/389 |
| 2004/0179535 A1 | * | 9/2004 | Bertagna | 370/395.21 |

* cited by examiner

*Primary Examiner*—Wing Chan
*Assistant Examiner*—Brian Roberts
(74) *Attorney, Agent, or Firm*—Stolowitz Ford Cowger LLP

(57) ABSTRACT

Apparatus and methods for efficient queuing and dequeuing using segmented output buffers comprising sub-buffers and priority queues. Output buffers are monitored for empty sub-buffers. When a newly empty sub-buffer is discovered, a refill request is enqueued in a ranked priority queue wherein the rank of the destination priority queue is based on the number of empty-sub-buffers in the requesting output buffer. All high priority refill requests are dequeued before lower priority refill requests, thereby reducing the possibility of starvation. Optionally, by using simple dequeuing criteria, such as a FIFO discipline, instead of complex algorithms designed to improve fairness, system resources may be conserved thereby improving system throughput.

40 Claims, 4 Drawing Sheets

APPARATUS AND METHOD FOR PRIORITY QUEUING WITH SEGMENTED BUFFERS

FIELD OF INVENTION

Invention relates to apparatus and methods for reducing the risk of underflow in a multiple queue system.

BACKGROUND OF INVENTION

Queues are used in a variety of applications, especially where resources are shared. For example, queues may be used to manage traffic in routers, file and data servers or to schedule processes and/or threads in single and/or multi-processor systems. A variety of techniques may be used to prioritize resource requests in an effort to improve throughput or efficiency or to guarantee a quality of service (QoS). However, many of these techniques run the risk of starving some requesters. In order to address the issue of starvation, complex algorithms may be used to enqueue and/or de-queue resource requests based on a variety of parameters. However, when complex algorithms are used to reduce starvation, precious system resources are consumed by the increased calculations and/or delays are introduced, thereby reducing overall throughput.

What is needed is a method and apparatus for enqueing and dequeuing requests that reduces starvation based on an economical use of system resources.

SUMMARY OF INVENTION

The present invention provides apparatus and methods for efficient queuing and dequeuing using segmented output buffers and priority queues. According to the current invention, each output buffer is segmented into a multiplicity of sub-buffers. A set of ranked priority queues are used to hold refill requests for the output buffers. Output buffers are monitored for empty sub-buffers. When a newly empty sub-buffer is discovered, a refill request is enqueued in a priority queue wherein the rank of the destination priority queue is based on the number of empty-sub-buffers in the requesting output buffer. By dequeuing refill requests in an order according to the rank of the priority queues, all high priority refill requests are dequeued before lower priority refill requests. In this way, the possibility of starvation is reduced because an output buffer's refill request will eventually be registered in the highest priority queue as it nears starvation.

According to an example of the current invention, a first-in first-out (FIFO) queuing discipline may be used to dequeue each priority queue. By using simple dequeuing criteria, such as a FIFO discipline instead of complex algorithms designed to improve fairness, system resources may be conserved thereby improving system throughput.

According to an example of the current invention, all sub-buffers may be the same size. Adding this constraint may improve the fairness of the current invention. In some cases, the items in the sub-buffers may be pointers or references and the size of the reference or pointer may not be related to the magnitude of the referenced items; in some cases, an additional constraint may be added wherein each referenced item has the same maximum magnitude.

According to the current invention, examples of the queuing apparatus and method according to the current invention may be used to enqueue/dequeue data requests, queries and/or transactions, to prioritize processes and/or threads and/or to route network traffic. Furthermore, examples of the queuing apparatus and method according to the current invention may be used to enqueue/dequeue physical items in a manufacturing, packaging and/or distribution system. In some cases, a system may use two or more queuing apparatus according to the current invention.

Advantageously, the current invention may be implemented in software, hardware and/or firmware. The current invention may also be used in physical processes or systems where resources are distributed to multiple destinations.

DETAILED DESCRIPTION OF PREFERRED EMBODIMENTS

Figure 1:
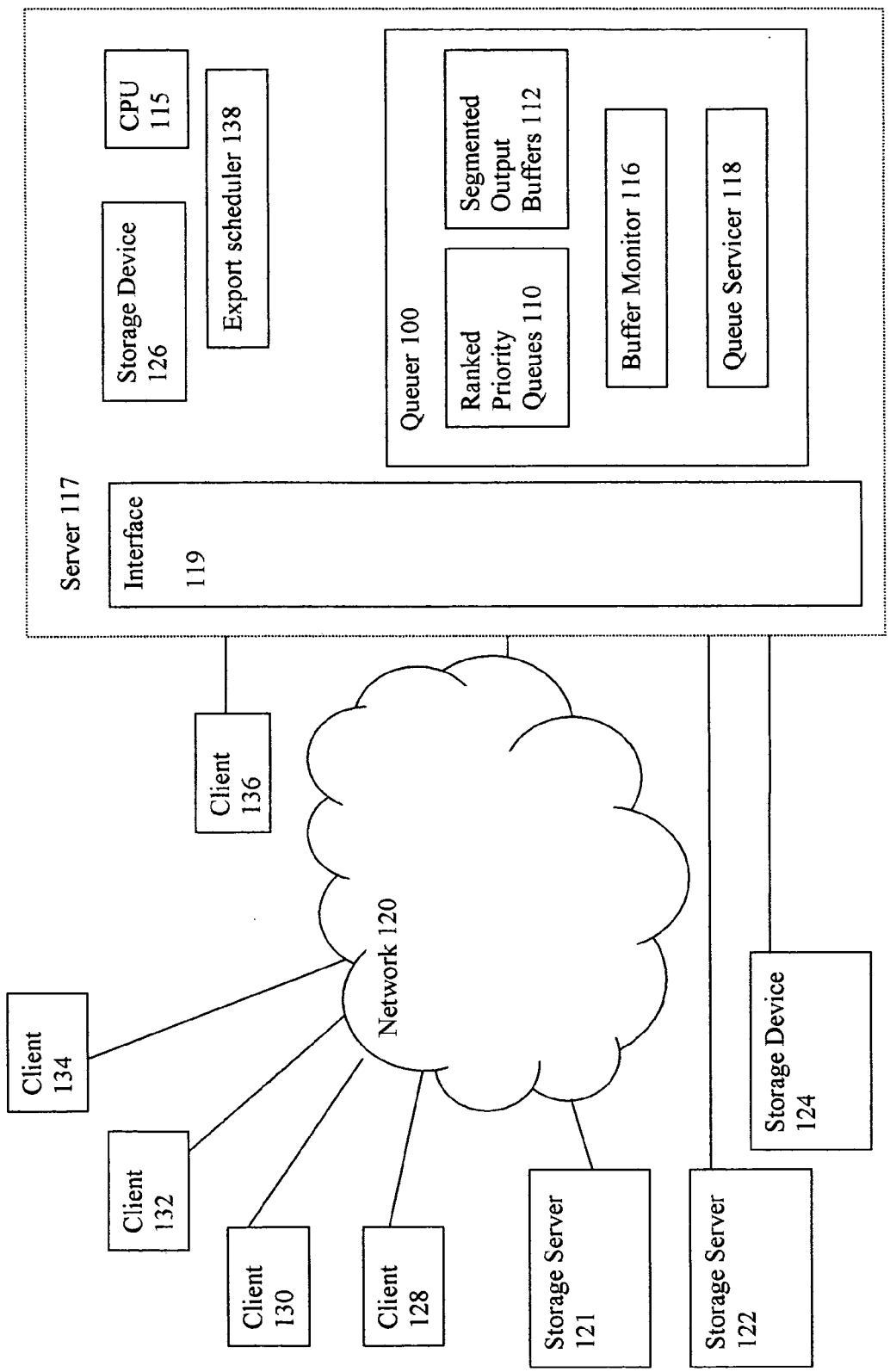
FIG. 1 illustrates an example of a queuing apparatus according to the current invention deployed in a file server environment.
Figure 2:
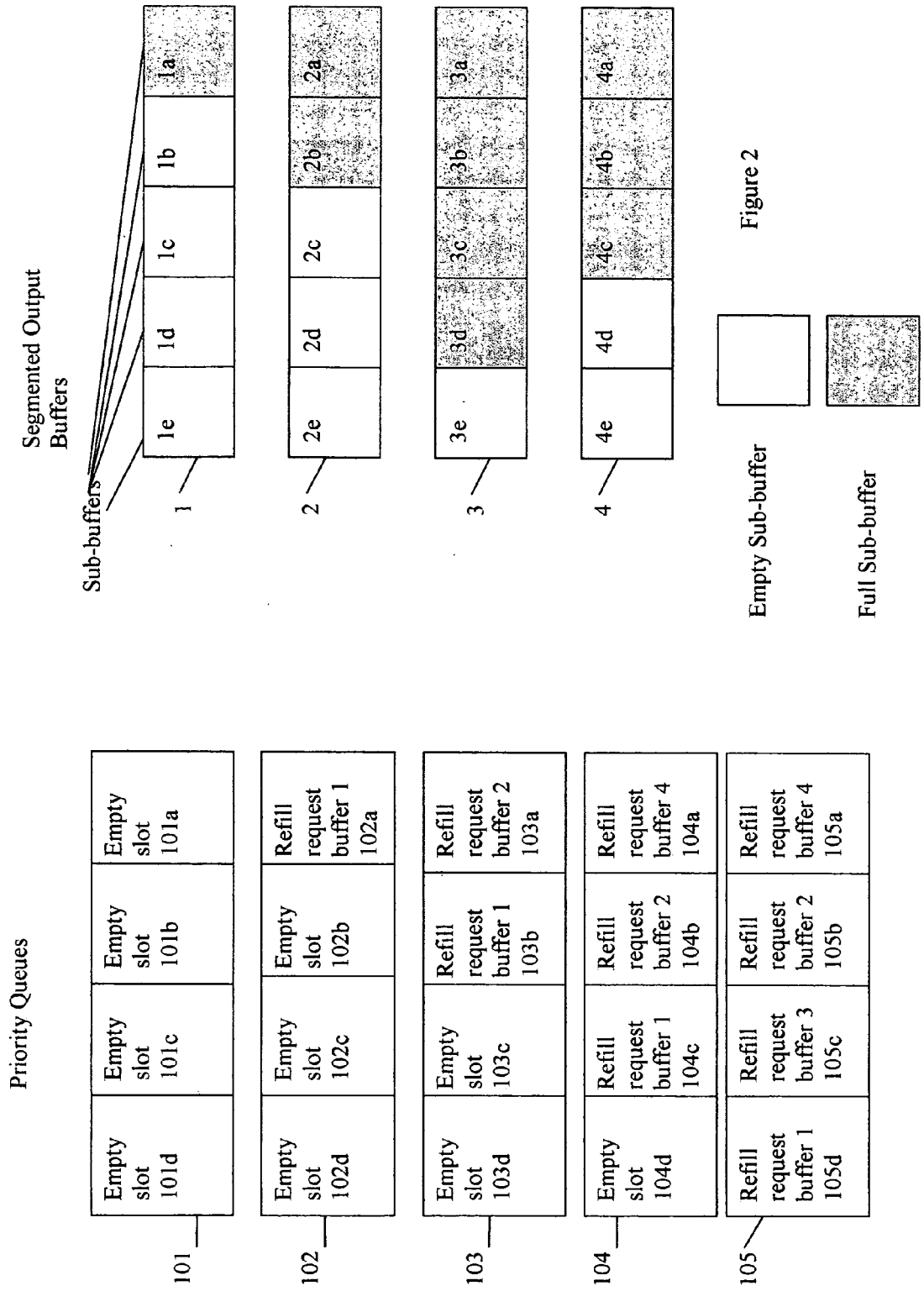
FIG. 2 illustrates an example configuration of segmented output buffers and priority queues.

FIG. 1 illustrates an example of a queuing apparatus 100 according to the current invention, deployed in a file server environment. A queuing apparatus 100 according to the current invention comprises a set of priority queues (110 in this example), a set of segmented output buffers (112 in this example), a buffer monitor (116 in this example) and a queue servicer (118 in this example). In this example, data is being transferred from data sources (represented by external networked storage device 121, external storage devices 122 and 124 and internal storage device 126) to data targets represented by external clients 128, 130, 132 and 134 and local client 136. In this example, queuing apparatus 100 resides on a server 117 and is used to prioritize data traffic traveling from the data sources (121, 122, 124 and 126) to the data targets (128, 130, 132, 134 and 136). According to the current invention, a queuing apparatus 100 comprises a set of segmented output buffers 112. The segmented output buffers comprise a multiplicity of sub-buffers. FIG. 2 illustrates an example configuration of segmented output buffers 1, 2, 3 and 4 and priority queues 101, 102, 103, 104 and 105 respectively. In this example, each sub-buffer (1*a-e*, 2*a-e*, 3*a-e* and 4*a-e*) is the same size. However, according to other examples of the current invention, the size of the sub-buffers may or may not vary within a segmented output buffer and/or between segmented output buffers. In this example, the sub-buffers (1*a-e*, 2*a-e*, 3*a-e* and 4*a-e*) hold chunks of data enqueued for transfer to data targets (clients 128, 130, 132, 134 and 136). For example, this data may represent text, files, data, audio and/or video streams. In some cases, the current invention may be used to help transmit, broadcast and/or multicast data to multiple data targets. In other examples according to the current invention, sub-buffers may hold other items such as, but not limited to, data, pointers and/or identifiers representing processes, threads, queries, network traffic and/or transactions. A queuing apparatus 100, according to the current invention, further comprises a set of ranked priority queues 110 for holding prioritized requests for data, a buffer monitor 116 and a queue servicer 118. In this example, the ranked priority queues (101, 102, 103, 104 and 105) comprise slots (101*a-d*, 102*a-d*, 103*a-d*, 104*a-d* and 105*a-d*); each slot is capable of holding a refill request for a sub-buffer (1*a-e*, 2*a-e*, 3*a-e* and 4*a-e*). In this example, each ranked priority queue (101, 102, 103, 104 and 105) comprises one slot per segmented output buffer (1, 2, 3 and 4); in this example, there are four segmented output buffers (1, 2, 3 and 4), so each ranked priority queue (101, 102, 103, 104 and 105) comprises four slots (101*a-d*, 102*a-d*, 103*a-d*, 104*a-d* and 105*a-d*). In this example, the buffer monitor 116 monitors the segmented output buffers 112 and enqueues a refill request in a ranked priority queue (101, 102, 103, 104 or 105) each time an empty sub-buffer (such as, 1*b-e*, 2*c-2*, 3*e*, 4*d* and 4*e*) is identified. A refill request is a request associated with a particular segmented output buffer (1, 2, 3 or 4) to refill at least one empty sub-buffer (for example, 1*b-e*, 2*c-2*, 3*e*, 4*d* and 4*e*).

The rank of the destination priority queue (such as 101, 102, 103, 104 or 105) for the refill request is based on the number of empty sub-buffers (for example, 1*b-e*, 2*c-2*, 3*e*, 4*d* and 4*e*) in the segmented output buffer (1, 2, 3, or 4). In this example, priority queue 101 has the highest rank and holds the most urgent requests; priority queue 105 has the lowest rank and holds the least urgent requests. In this example, a request in the lowest rank priority queue 105 corresponds to the case where a single sub-buffer in a segmented output buffer is empty. A request corresponding to two empty sub-buffers in a segmented output buffer would be enqueued in priority queue 104; a request corresponding to three empty sub-buffers in a segmented output buffer would be enqueued in priority queue 103; a request corresponding to four empty sub-buffers would be enqueued in priority queue 102; a request corresponding to all five sub-buffers being empty would be enqueued in priority queue 101. The following examples illustrate the operation of this example of the current invention:

Example 1

For example, when sub-buffer 3*e* became empty, segmented output buffer 3 held one empty sub-buffer (3*e*) and a refill request was enqueued in priority queue 105; slot 105*c* holds this refill request; if slot 3*d* were to become empty, leaving two empty sub-buffers (3*d* and 3*e*) in segmented output buffer 3, a refill request would then be registered in an empty slot (104*d*) in priority queue 104.

Example 2

For example, when sub-buffer 4*d* became empty, segmented output buffer 4 held two empty sub-buffers (4*d* and 4*e*) and a refill request was enqueued in priority queue 104; slot 104*a* holds this refill request.

Example 3

For example, when sub-buffer 2*c* became empty, segmented output buffer 2 held three empty sub-buffers (2*c-e*) and a refill request was enqueued in priority queue 103; slot 103*a* holds this request.

In the example illustrated in FIG. 2, the segmented output buffers (1, 2, 3, and 4) all have the same number of sub-buffers (1*a-e*, 2*a-e*, 3*a-e* or 4*a-e*) and the total number of priority queues (101, 102, 103, 104 and 105) corresponds to the maximum possible number of empty sub-buffers in a segmented output buffer; in this case, there are five sub-buffers (1*a-e*, 2*a-e*, 3*a-e* or 4*a-e*) per segmented output buffer (1, 2, 3, and 4) and five corresponding priority queues (101, 102, 103, 104 and 105). However, in other examples, the number of sub-buffers per segmented output buffer may or may not vary and the number of priority queues may or may not match the maximum number of empty sub-buffers per segmented output buffer. For example, in some cases, the number of ranked priority queues may be less than the maximum number of empty sub-buffers per segmented output buffer; in some cases, this design may be used to conserve system resources in the case where completely empty segmented buffers are unexpected or extremely rare. In this case, the highest priority queue may be used to hold requests from segmented output buffers that are empty except for a single full or partially full sub-buffer and no additional requests are registered if the segmented buffer becomes completely empty.

Queue servicer 118 services the ranked priority queues 110. Queue servicer 118 dequeues requests (such as 102*a*, 103*a*, 103*b*, 104*a-c* and 105*a-d*) from the priority queues (such as 101, 102, 103, 104 and 105) servicing the highest priority, non-empty priority queues before servicing any other queues. In this case, a simple FIFO queuing discipline per priority queue (101, 102, 103, 104 and 105) is used; for example, if requests were enqueued in priority queue 105 into slots 105*a*, 105*b*, 105*c* and 105*d* in that order, they will be dequeued and serviced in that same order (first 105*a*, second 105*b*, third 105*c* and fourth 105*d*). However, in other examples according to the current invention, other queuing disciplines may be used.

In some cases, the queue servicer 118 may correlate a particular segmented output buffer with a source for satisfying the requests associated with that segmented output buffer. For example, when deployed in a file server application, a queue servicer 118 may maintain a lookup table, have access to a lookup table or have access to a service that identifies an index into a file on a particular file server identifying the next chunk of data that should be served to a particular segmented output buffer (1, 2, 3 or 4). In this case, a refill request such as (such as 102*a*, 103*a*, 103*b*, 104*a-c* and 105*a-d*) enqueued in a priority queue (such as 101, 102, 103 104 or 105) may be as simple as an identifier referring to the segmented output buffer (1, 2, 3 or 4) with a newly empty sub-buffer (for example, 1*b-e*, 2*c-2*, 3*e*, 4*d* and 4*e*). However, in other examples of the current invention, the queue servicer may be less sophisticated and additional information may be incorporated into the request such as, but not limited to, the source for filling the request. For example, when used in a networking implementation, the source may be a buffer associated with an incoming port.

In the example illustrated in FIG. 1, the sub-buffers (1*a-e*, 2*a-e*, 3*a-e* and 4*a-e*) are all the same size and are capable of holding chunks of data. However, the size of the segmented output buffer (such as 1, 2, 3 or 4) and/or sub-buffer (such as 1*a-e*, 2*a-e*, 3*a-e* and 4*a-e*) may be designed and/or altered to improve fairness based on the size of the data transfers. For example, if the size of the sub-buffer (such as 1*a-e*, 2*a-e*, 3*a-e* and 4*a-e*) is much larger than required for a typical data transfer, the fairness and/or efficiency of the current invention may be improved by shrinking the sub-buffer (1*a-e*, 2*a-e*, 3*a-e* and 4*a-e*) size. In some examples according to the current invention, the segmented output buffer size and/or sub-buffer size may be static or dynamic; in some cases, the sub-buffer size may be evaluated one or more times to assess and/or alter the sub-buffer size for improved performance and/or fairness.

In the file server example illustrated in FIG. 1, the sub-buffers (1*a-e*, 2*a-e*, 3*a-e* and 4*a-e*) hold actual chunks of data and the size of the sub-buffer (1*a-e*, 2*a-e*, 3*a-e* and 4*a-e*) represents the maximum magnitude of a data chunk that may be enqueued. However, in other examples according to the current invention, the sub-buffers may hold other items such as, but not limited to, data, pointers and/or identifiers representing processes, threads, queries, network traffic and/or transactions. In some cases, identically sized pointers and/or identifiers may refer to differently sized items. In an example according to the current invention, a further constraint may be added incorporating the concept that the pointers or identifiers may refer to an item of a maximum magnitude, which may improve the fairness of service.

The current invention may be implemented in software, hardware and/or firmware. For example, the current invention may be implemented in-part in a single threaded or multi-threaded environment. For example, a queue servicer (such as queue servicer 118) may comprise one or more threads in a multi-threaded environment or be part of a larger process in a single threaded environment. Similarly, a buffer monitor (such as buffer monitor 116) may comprise one or more threads in a multi-threaded environment or be part of a larger process in a single threaded environment. In some cases, there may be multiple buffer monitors; for example, each segmented output buffer may have its own buffer monitor. In some cases, some or all of the invention may be implemented in one or more Field Programmable Gate Arrays (FPGAs) and/or Application Specific Integrated Circuits (ASICS). In some cases, the invention may be implemented in software using various data structures, such as circular queues, lists and/or stacks may be used to implement the segmented output buffers.

In the example illustrated in FIG. 1, the current invention 100 is deployed in a networked file server system. A computer system for efficient data queuing comprises a queuer 100 and at least one interface 119. The contents (or the de-referenced contents) of the segmented output buffers (such as 1, 2, 3 and 4) may be unloaded through an interface (such as interface 119) according to a variety of methods. In some cases, the data may be pulled from the segmented output buffers (such as 1, 2, 3 and 4) through an interface such as 119 by an external process, thread or entity such as, but not limited to, an external export scheduler or a process, thread or entity residing on a target client (such as clients 128, 130, 132, 134 and 136) and/or on another external device; in other cases, the contents of the segmented buffers may be pushed through the interface from a process, thread or entity such as an export scheduler 138 that may reside, wholly or in part, within the queuer 100, and/or be co-located on the same system, such as server 117. An optional export scheduler such as export scheduler 138 is responsible for de-queuing the segmented output buffers 112 and exporting the contents of the segmented output buffers (or their de-referenced contents) to interfaces (such as interface 119) for delivery to targets such as 128, 130, 132, 134 and 136. In the example illustrated in FIG. 1, the optional export scheduler 138 is responsible for de-queuing data from the segmented output buffers 112 and submitting the de-queued data to an interface 119 for transport to one or more clients such as, but not limited to, a directly coupled target client 136 or networked target clients such as 128, 130, 132, 134 and 136. In other examples according to the current invention, the optional export scheduler may be coupled to one or more targets through direct and/or networked, persistent and/or intermittent connections. Depending on the implementation, the interface (such as interface 119) may comprise hardware and/or software; for example, in some cases, the interface (such as interface 119) may comprise a cable, a connector and a protocol for exporting data. In some cases, the targets may be implemented within the same chip or system as the current invention and the interface (such as 119) may comprise a direct electrical connection and/or a software interface; in some cases, the targets may be implemented within a software system and the interface (such as 119) may comprise a software interface In some cases, there may be multiple export schedulers; for example, there may be one export scheduler per segmented buffer. Export schedulers such as 138 may be implemented with simple or complex functionality. For example, an export scheduler 138 may be used to transmit data onto a network such as 120 in a video broadcast application in a "send and forget" configuration, without concern for the ability of the target clients (such as 128, 130, 132 and 134) to receive the data; for example, the export scheduler 138 may not communicate with the target clients (such as 128, 130, 132 and 134) to confirm connectivity, bandwidth and/or receipt of the data. In other examples according to the current invention, the export scheduler 138 may be sophisticated. For example, the export scheduler 138 may take into consideration issues of connectivity and bandwidth before transmitting data and/or communicate with the target client (such as 128, 130, 132, 134 and 136) to negotiate transmission rates and/or confirm and/or acknowledge transmissions. In some cases, the export scheduler 138 may be combined with the buffer monitor 116 to improve efficiency. For example, a combined export scheduler/buffer monitor thread or process could be used to dequeue the segmented output buffers 1, 2, 3 and 4 and monitor the segmented output buffers 1, 2, 3 and 4 for empty sub-buffers (such as 1b-e, 2c-e, 3e, 4d and 4e). In this case, the combined export scheduler/buffer monitor may detect when it reached a sub-buffer end, thereby creating an empty sub-buffer (such as 1b-e, 2c-e, 3e, 4d and 4e), and may rapidly and accurately submit a request (such as 102a, 103a, 103b, 104a-c or 105a-d) to a ranked priority queue (such as 101, 102, 103, 104 or 105) based on the total number of empty sub-buffers (such as 1b-e, 2c-e, 3e, 4d and 4e) in the segmented output buffer (such as 1, 2, 3 or 4). By combining the export scheduler 138 and buffer monitor 116 into a single thread or process, the overhead and/or delay associated with other implementations such as polling-based implementations may be reduced. An export scheduler may or may not reside on the same system as the queuer. In the example illustrated in FIG. 1, the export scheduler 138 resides on the same server 117 as the queuer 100. However, an export scheduler 138 may be an element incorporated into the queuer 100 as described above. In another example, an export scheduler may reside wholly or partially on an external system such as a target client (such as clients 128, 130, 132, 134 and/or 136). For example, some or all of an export scheduler may reside on a client (such as clients 128, 130, 132, 134 and/or 136) and be granted permission to remotely retrieve data from a segmented output buffer such as 1, 2, 3 and/or 4.

Figure 3:
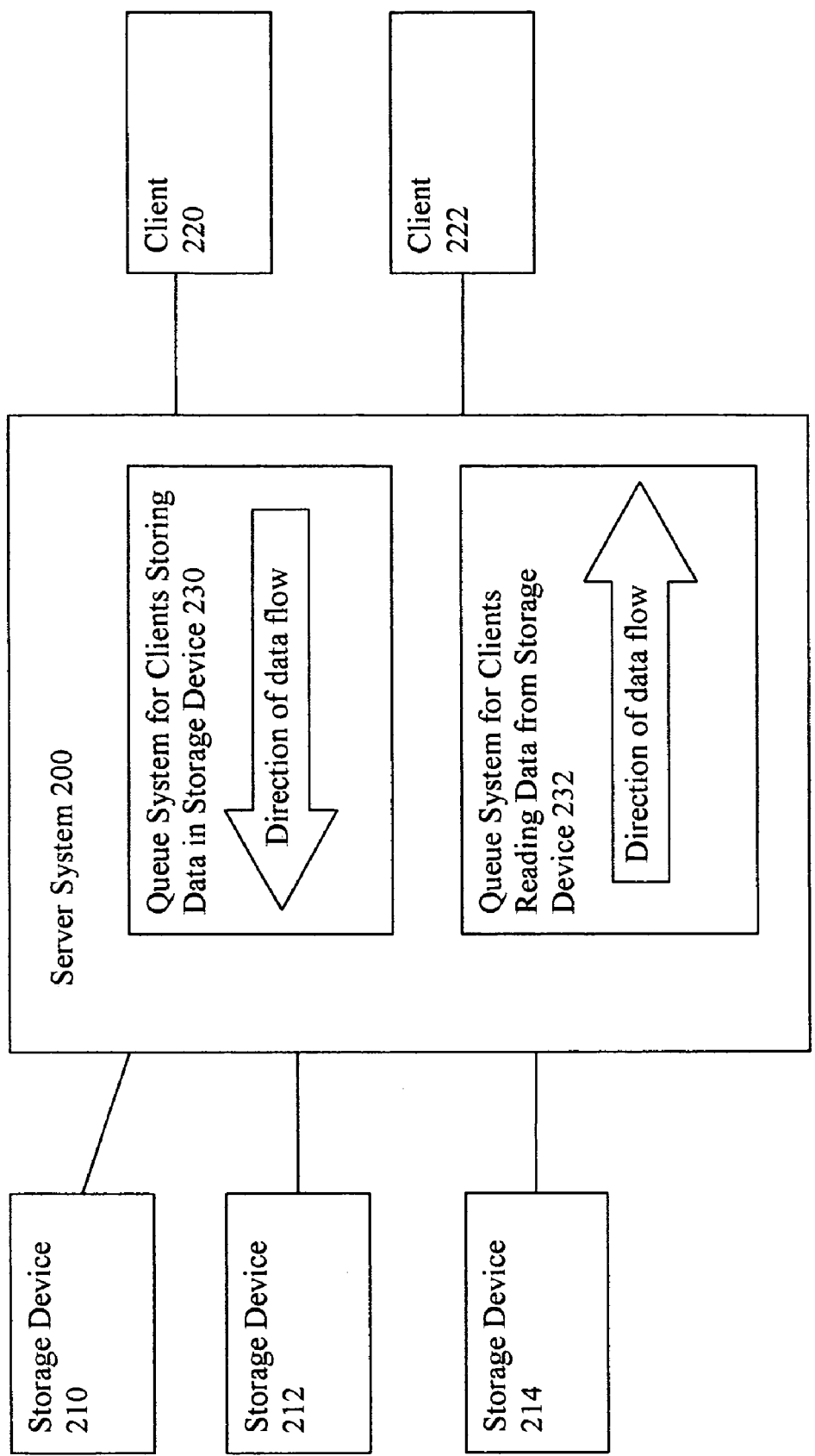
FIG. 3 illustrates an example of a server system with multiple queuing apparatus according to the current invention deployed in a file server environment.

FIG. 3 illustrates an example of a server system 200 with multiple queuing apparatus (230 and 232) according to the current invention deployed in a file server environment. In this example, a queue system 232 queues traffic transmitted from storage devices 210, 212 and 214 to clients 220 and 222; a second queue system 230 queues traffic from clients 220 and 222 to storage devices 210, 212 and 214. For example, server system 200 may be deployed in a video editing environment where large video files reside on storage devices 210, 212 and 214. In this video editing example, server system 200 may be a Linux server configured to support a clustered file server environment and enable multiple clients, such as clients 220 and 222, to access the files residing on storage devices 210, 212 and 214 wherein the fairness of that access is mediated by queuing system 232; similarly, using a clustered file server environment, clients 220 and 222 may write to files residing on storage devices 210, 212 and 214 wherein the fairness of that access is mediated by queuing system 230. In this example, other aspects of data transfer, such as access security and/or transaction commit and locking mechanisms, may be managed by systems external to the current invention, such as the Linux clustered file server. Queue systems such as queue system 232 may be deployed in large, small, clustered and/or unclustered environments and with a variety of architectures such as, but not limited to, storage area network (SAN), network attached storage (NAS), direct attached storage or virtualized storage architectures and any combination thereof.

Figure 4:
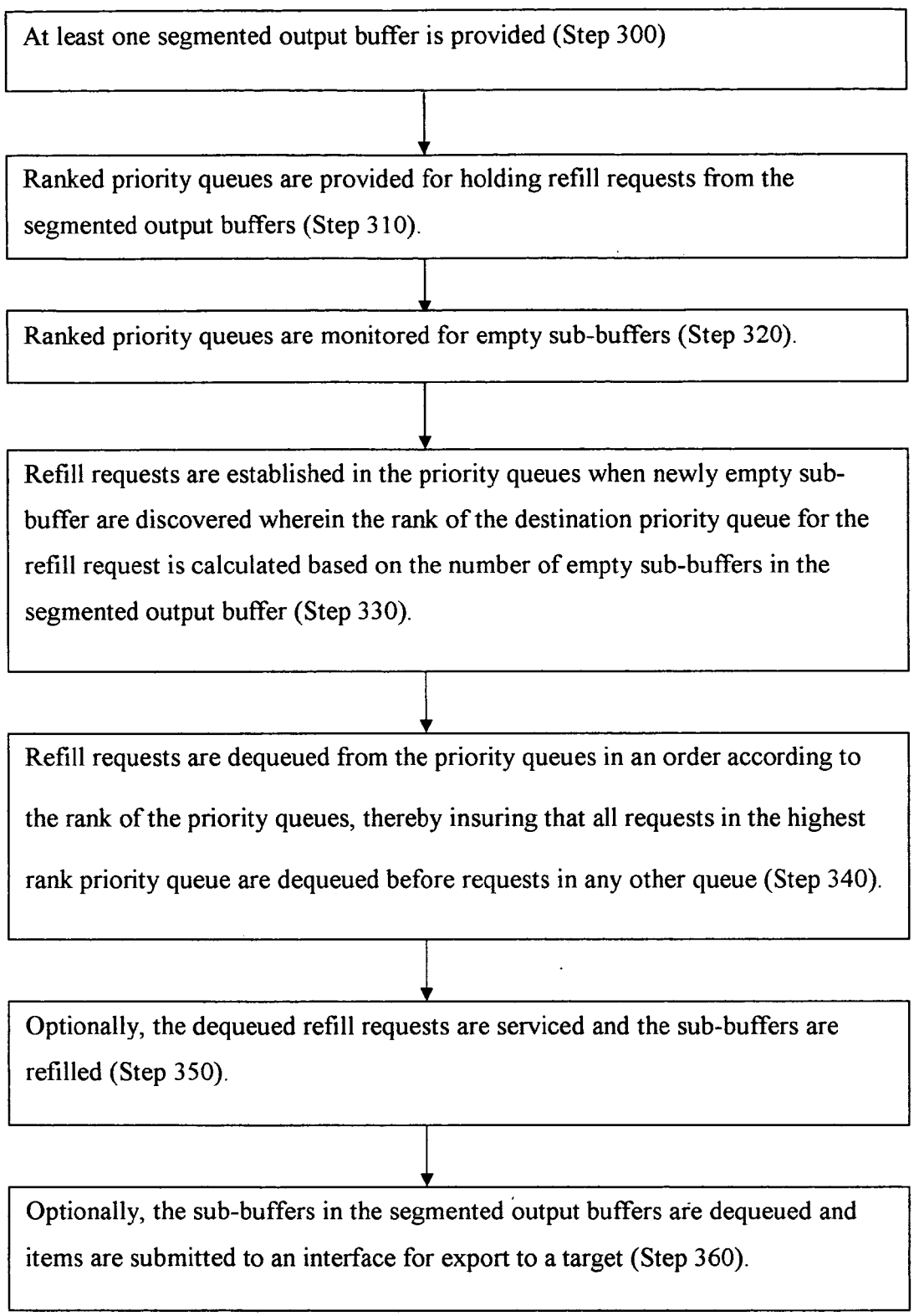
FIG. 4 is a block diagram illustrating an example method of efficient queuing and de-queuing according to the current invention.

FIG. 4 is a block diagram illustrating an example method of efficient queuing and de-queuing according to the current invention. The process begins when at least one segmented output buffer is provided (Step 300). A segmented output buffer comprises a multiplicity of sub-buffers wherein each sub-buffer may hold items such as, but not limited to, data, pointers, process identifiers, queries, thread identifiers, transactions, transaction identifiers, network packets and physical objects for export. Ranked priority queues are provided for holding refill requests from the segmented output buffers (Step 310). Ranked priority queues are monitored for empty sub-buffers (Step 320). Refill requests are established in the priority queues when newly empty sub-buffer are discovered wherein the rank of the destination priority queue for the refill request is calculated based on the number of empty sub-buffers in the segmented output buffer (Step 330). Refill requests are dequeued from the priority queues in an order according to the rank of the priority queues, thereby insuring that all requests in the highest rank priority queue are dequeued before requests in any other queue (Step 340). In some cases, each priority queue may be dequeued according to a simple queuing discipline such as FIFO. However, other simple or complex disciplines may be used. Optionally, the dequeued refill requests are serviced and the sub-buffers are refilled (Step 350). Optionally, the sub-buffers in the segmented output buffers are dequeued and items are submitted to an interface for export to a target (Step 360).

Foregoing descriptions of specific embodiments of the invention have been presented for purposes of illustration and description. They are not intended to be exhaustive or to limit the invention to the precise forms disclosed. Modifications and variations are possible in light of the above teaching. For example, applicants contemplate that present invention may be used in various software, firmware and/or hardware applications such as network routers, process queuers, storage area networks and/or unicast, broadcast and/or multicast systems as well as industrial and/or manufacturing applications.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

I claim:

1. A method for efficient queuing, the method comprising:
providing at least one output buffer wherein each output buffer comprises a multiplicity of sub-buffers;
providing a plurality of priority queues for holding refill requests for the output buffers wherein the priority queues are ranked from highest priority to lowest priority;
monitoring the output buffers for empty sub-buffers and establishing a refill request in one of the priority queues when at least one newly empty sub-buffer is discovered wherein the rank of the destination priority queue for the refill request is calculated according to the number of empty sub-buffers in the output buffer; and,
dequeuing refill requests in an order according to the rank of the priority queues, thereby dequeuing all requests in the highest rank priority queue before dequeuing any requests of any other priority.

2. The method of claim 1 further comprising the step of servicing refill requests after they are dequeued, thereby filling empty sub-buffers.

3. The method of claim 1 wherein the step of dequeuing refill requests further comprises using a first-in first-out (FIFO) queuing discipline per priority queue.

4. The method of claim 1 wherein each output buffer has the same number of sub-buffers.

5. The method of claim 1 wherein each sub-buffer is the same size.

6. The method of claim 1 wherein each sub-buffer holds a reference to an item and wherein each referenced item has the same maximum magnitude.

7. The method of claim 1 wherein each sub-buffer holds items selected from the list comprising: data, pointers, process identifiers, thread identifiers, queries, transactions, transaction identifiers or network packets or any combination thereof.

8. The method of claim 1 wherein each request comprises an output buffer identifier.

9. An efficient computer queuing system comprising:
at least one output buffer wherein each output buffer comprises a plurality of sub-buffers;
a plurality of priority queues for holding refill requests for the output buffers wherein the priority queues are ranked from highest priority to lowest priority;
a buffer monitor for monitoring the output buffers for empty sub-buffers and establishing refill requests in the priority queues wherein the rank of the destination priority queue for the requests are based on the number of empty sub-buffers in the output buffer; and,
a queue servicer for dequeuing refill requests in the priority queues in an order according to the rank of the priority queues, thereby dequeuing all refill requests in the highest rank priority queue before dequeuing any refill requests in a lower rank priority queue.

10. The system of claim 9 wherein each output buffer has the same number of sub-buffers.

11. The apparatus of claim 9 wherein each sub-buffer is the same size.

12. The apparatus of claim 9 wherein each sub-buffer holds a reference to an item and wherein each referenced item has the same maximum magnitude.

13. The apparatus of claim 9 wherein each sub-buffer holds items selected from the list consisting of: data, pointers, process identifiers, thread identifiers, queries, transactions, transaction identifiers and network packets.

14. The system of claim 9 wherein each request comprises an output buffer identifier.

15. A computer system for efficient data queuing comprising:
a queuing system comprising:
at least one output buffer wherein each output buffer comprises a multiplicity of sub-buffers;
a plurality of priority queues for holding refill requests for the output buffers wherein the priority queues are ranked from highest priority to lowest priority;
a buffer monitor for monitoring the output buffers for empty sub-buffers and establishing refill requests in the priority queues wherein the rank of the destination priority queue for the requests are based on the number of empty sub-buffers in the output buffer; and, a queue servicer for dequeuing and servicing refill requests in the priority queues in an order according to the rank of the priority queues, thereby dequeuing all refill requests in the highest rank priority queue before dequeuing any refill requests in a lower rank priority queue;

and, one or more interfaces for coupling said queuing apparatus to targets and sources wherein a target may be coupled to an outgoing queue enabling a target to receive items from an output buffer and wherein a source may provide items for servicing data refill requests.

16. The computer system of claim 15 wherein each sub-buffer holds items selected from the list consisting of: data, pointers, process identifiers, thread identifiers, queries, transactions, transaction identifiers and network packets.

17. The computer system of claim 15 coupled to an export scheduler for dequeuing the output buffers and exporting the contents of the sub-buffers to an interface.

18. The computer system of claim 17 wherein the contents of the sub-buffers are exported to an interface for delivery to targets.

19. The computer system of claim 17 wherein the contents of the sub-buffers are exported to an interface, the contents of the sub-buffers are de-referenced and provided for delivery to targets.

20. The computer system of claim 17 wherein the export scheduler is configured to confirm connectivity between the interface and one or more target clients before exporting the contents of the sub-buffers to an interface.

21. The computer system of claim 17 wherein the export scheduler is not configured to confirm connectivity between the interface and one or more target clients before exporting the contents of the sub-buffers to an interface.

22. The computer system of claim 17 wherein the export scheduler is configured to check bandwidth constraints between the interface and one or more target clients before exporting the contents of the sub-buffers to an interface.

23. The computer system of claim 17 wherein the export scheduler is not configured to check bandwidth constraints between the interface and one or more target clients before exporting the contents of the sub-buffers to an interface.

24. The computer system of claim 17 wherein the export scheduler is configured to confirm delivery of the exported contents of the sub-buffer to one or more target clients.

25. The computer system of claim 17 wherein the export scheduler is not configured to confirm delivery of the exported contents of the sub-buffer to one or more target clients.

26. The computer system of claim 17 wherein the export scheduler is configured to negotiate a transmission rate with one or more target clients before exporting the contents of the sub-buffers to an interface.

27. The computer system of claim 17 wherein the export scheduler is not configured to negotiate a transmission rate with one or more target clients before exporting the contents of the sub-buffers to an interface.

28. The computer system of claim 17 wherein said export scheduler and said buffer monitor are combined in the same process module.

29. The computer system of claim 17 wherein said export scheduler is disposed in the computer system.

30. The computer system of claim 17 wherein said export scheduler is external to the computer system.

31. The computer system of claim 17 wherein said export scheduler is co-located with a data target.

32. The computer system of claim 15 wherein said interface comprises a software or firmware interface or any combination thereof.

33. The computer system of claim 15 wherein said interface comprises a physical interface.

34. The computer system of claim 15 wherein said interface comprises a network interface.

35. The computer system of claim 15 wherein the computer system is disposed on a file server.

36. The computer system of claim 15 comprising two or more queuing systems.

37. The computer system of claim 15 wherein the queuing system mediates the fairness of access to data stored on a file system.

38. The computer system of claim 37 wherein access to data comprises read access or write access.

39. The computer system of claim 37 wherein the file system comprises a clustered file system.

40. The computer system of claim 37 wherein the file system comprises a system selected from the group comprising a clustered storage system, an unclustered storage system, a storage area network (SAN) system, a network attached storage (NAS) system, a direct attached storage system or a virtualized storage architectures system or any combination thereof.

* * * * *

UNITED STATES PATENT AND TRADEMARK OFFICE
CERTIFICATE OF CORRECTION

PATENT NO.         : 7,428,239 B1
APPLICATION NO.    : 10/927801
DATED              : September 23, 2008
INVENTOR(S)        : Seigneurbieux Page 1 of 1

It is certified that error appears in the above-identified patent and that said Letters Patent is hereby corrected as shown below:

Claim 11 column 8, line 44, please replace "The apparatus" with --The system--.
Claim 12 column 8, line 46, please replace "The apparatus" with --The system--.
Claim 13 column 8, line 49, please replace "The apparatus" with --The system--.

Signed and Sealed this
Fifteenth Day of May, 2012

David J. Kappos
*Director of the United States Patent and Trademark Office*